(12) United States Patent
Yu et al.

(10) Patent No.: US 12,428,520 B2
(45) Date of Patent: Sep. 30, 2025

(54) EPOXY RESIN COMPOSITION

(71) Applicant: BASF SE, Ludwigshafen am Rhein (DE)

(72) Inventors: Miran Yu, Ludwigshafen am Rhein (DE); Guenter Scherr, Ludwigshafen am Rhein (DE); Marco Arnold, Ludwigshafen am Rhein (DE); Dieter Mayer, Ludwigshafen am Rhein (DE); Madhura Shreekar Pawar, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 572 days.

(21) Appl. No.: 17/913,179

(22) PCT Filed: Mar. 24, 2021

(86) PCT No.: PCT/EP2021/057579
§ 371 (c)(1),
(2) Date: Sep. 21, 2022

(87) PCT Pub. No.: WO2021/191282
PCT Pub. Date: Sep. 30, 2021

(65) Prior Publication Data
US 2023/0134713 A1     May 4, 2023

(30) Foreign Application Priority Data
Mar. 26, 2020   (EP) .................................. 20165943

(51) Int. Cl.
*C08G 59/40*     (2006.01)
*C08G 59/32*     (2006.01)
(Continued)

(52) U.S. Cl.
CPC ..... *C08G 59/4085* (2013.01); *C08G 59/3218* (2013.01); *C08G 59/621* (2013.01); *C08L 63/00* (2013.01)

(58) Field of Classification Search
CPC .............. C08G 59/4085; C08G 59/621; C08G 59/3218; C08K 3/36
See application file for complete search history.

(56) References Cited

U.S. PATENT DOCUMENTS

| | | |
|---|---|---|
| 2011/0120761 A1 | 5/2011 | Kawai |
| 2012/0264870 A1 | 10/2012 | Shirrell |
| 2014/0087152 A1 | 3/2014 | Nakamura et al. |

FOREIGN PATENT DOCUMENTS

| | | |
|---|---|---|
| EP | 3093304 A1 | 11/2016 |
| JP | 2004-277460 A | 10/2004 |

(Continued)

OTHER PUBLICATIONS

Chen, et al., "Effect of Cavity Dimensions on TE01d Mode Resonance in Split-Post Dielectric Resonator Techniques", Journal of Electromagnetic Analysis and Applications, vol. 4, Issue 9, Sep. 2012, pp. 358-361.

(Continued)

*Primary Examiner* — Ling Siu Choi
*Assistant Examiner* — Olga Lucia Donahue
(74) *Attorney, Agent, or Firm* — Faegre Drinker Biddle & Reath LLP

(57) ABSTRACT

The present invention relates to a resin composition, comprising (a) an epoxy resin; (b) a curing agent comprising the structure of formula C1; (c) an inorganic filler; wherein $R^{C1}$ is (a) a siloxane group of formula C1a or (b) or both a siloxane group of formula C1a and an ester group of formula C1b; $R^{C2}$ is selected from a bulky $C_4$ to $C_{12}$ alkyl group comprising at least one tertiary or quaternary carbon atom; $R^{C11}$, $R^{C12}$, $R^{C13}$ are independently selected from methyl, ethyl and 1-propyl; $R^{C14}$ is selected from a linear or branched $C_1$ to $C_8$ alkyl; $X^{C1}$ is selected from a divalent $C_1$ to $C_4$ alkanediyl group; and n is an average number of repeating units and is from 1.05 to 200.

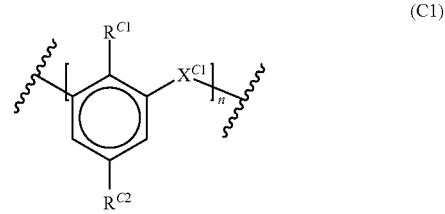

(C1)

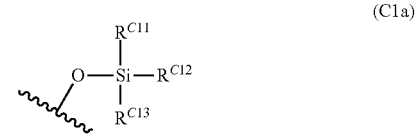

(C1a)

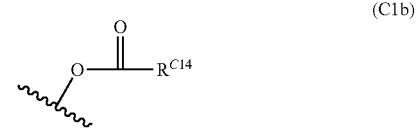

(C1b)

10 Claims, No Drawings

(51) Int. Cl.
*C08G 59/62* (2006.01)
*C08L 63/00* (2006.01)

(56) References Cited

FOREIGN PATENT DOCUMENTS

WO 2018/104151 A1 6/2018
WO 2020/064916 A1 4/2020

OTHER PUBLICATIONS

European Search Report for EP Patent Application No. 20165943.0, Issued on Sep. 18, 2020, 3 pages.
International Preliminary Report on Patentability received for PCT Patent Application No. PCT/EP2021/057579, mailed on Oct. 6, 2022, 7 pages.
International Search Report and Written Opinion received for PCT Patent Application No. PCT/EP2021/057579, mailed on Jun. 22, 2021, 10 pages.
Nishimoto Y. et al: "Preparation and properties of epoxy resins cured with silyl esters of phenol novolak and cresolo novolak", Journal of Thermal Analysis and Calorimetry, vol. 70, No. 3, 2002, pp. 741-746.
Ogura, I., "Low Dielectric Constant Epoxy Resins," Handbook of Low and High Dielectric Constant Materials and Their Applications, vol. 1, Sep. 7, 1999, pp. 213-240.

EPOXY RESIN COMPOSITION

CROSS-REFERENCE TO RELATED APPLICATIONS

This application is a national stage application (under 35 U.S.C. § 371) of PCT/EP2021/057579, filed Mar. 24, 2021, which claims benefit of European Application No. 20165943.0, filed Mar. 26, 2020, both of which are incorporated herein by reference in their entirety.

BACKGROUND OF THE INVENTION

The present invention relates to a resin composition. The present invention further relates to insulating films, prepregs, multilayered printed wiring boards, and semiconductor devices each of which contain such a resin composition.

In general, curing of epoxy resins may be achieved by reacting an epoxy with itself (homopolymerisation) or by forming a copolymer with polyfunctional curatives or hardeners. Alternatively, any curing agent containing a reactive hydrogen may react with the epoxide groups of the epoxy resin. Common classes of curing agents for epoxy resins include amines, acids, acid anhydrides, phenols, alcohols and thiols.

In recent years, downsizing and high functionalization of electronic instruments have been advanced. In multilayered printed wiring boards, a buildup layer has been made multilayered, and micro fabrication and high densification of wirings have been required.

Various attempts have been made to meet the requirements.

US 2012/0264870 A1 discloses a thermosettable epoxy resin composition for manufacturing printed circuit board circuitry comprising (a) an epoxy resin (b) an epoxidized cycloaliphatic dicyclopentadiene phenolic resin, and (c) an alkylphenol novolac curing agent of the general formula

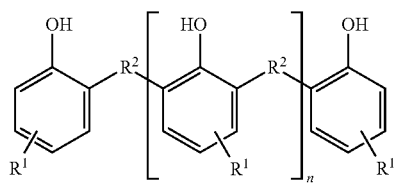

wherein $R^1$ may be an alkyl group or aryl group containing 2 to 20 carbon atoms, particularly containing 4 to 9 carbon atoms, and most particularly selected from a butyl, octyl or phenyl group. t-butyl-phenol novolac resins are explicitly mentioned. $R^2$ each $R^2$ may be an alkyl group, more preferably an alkyl group containing 1 to 5 carbon atoms, and most preferably a methyl or ethyl group; and n is a number between 2 and 20.

US 2011/120761 A discloses specific epoxy resin compositions which can be used in formation of an insulation layer for multilayer printed wiring boards. The epoxy resin composition comprises an active ester compound which acts as curing agent.

The Handbook of Low and High Dielectric Constant Materials and Their Applications, Volume 1 Materials and Processing, Chapter 5 "Low Dielectric Constant Epoxy Resins" (1999) discloses alkylphenol novolac epoxy resins, active ester novolac resins (hardeners) and silylated (SI) novolac-type hardeners like

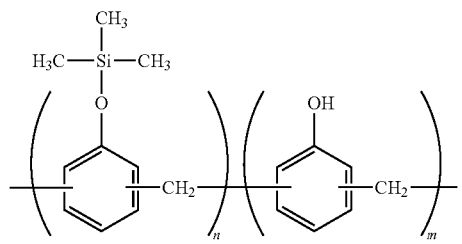

as materials that provide lower molar polarization after curing.

Unpublished patent application PCT/EP2019/076010 discloses a resin composition, comprising (a) an epoxy resin and (b) particular siloxane-type curing agents.

However, dielectric properties of these material class are often insufficient for advanced packaging applications. Especially dielectric properties like dielectric dissipation factor (also referred to as loss tangent) $D_f$ or dielectric constant $D_k$ are often insufficient compared to other prior art materials, particularly in combination with an inorganic filler like silica.

WO 2018104151 A1 discloses the use of Koresin® or similar resins in a tackifier for rubber compositions.

It is an object of the present invention to provide an epoxy resin composition which no longer exhibits the disadvantages of the prior art compositions.

In particular, the compounds according to the present invention shall provide an epoxy resin composition having improved dielectric properties, particularly improved $D_f$ and $D_k$. Furthermore, the compounds according to the present invention shall be applicable for use in electronic applications, particularly as insulating layer for packaging applications.

SUMMARY OF THE INVENTION

The present invention completely avoids, all the disadvantages of the prior art by using a curing agent as described herein.

Therefore, a first aspect of the present invention relates to a resin composition, comprising
(a) an epoxy resin,
(b) a curing agent comprising the structure of formula C1

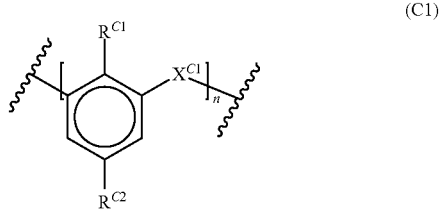

(C1)

(c) an inorganic filler;
wherein
$R^{C1}$ is
(a) a siloxane group of formula C1a

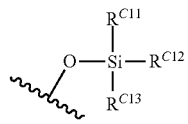
(C1a)

or (b) both a siloxane group of formula C1a and an ester group of formula C1b

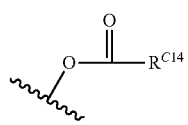
(C1b)

$R^{C2}$ is selected from a bulky $C_4$ to $C_{12}$ alkyl group comprising at least one tertiary or quaternary carbon atom;
$R^{C11}$, $R^{C12}$, $R^{C13}$ are independently selected from methyl, ethyl and 1-propyl;
$R^{C14}$ is selected from a linear or branched $C_1$ to $C_8$ alkyl;
$X^{C1}$ is selected from a divalent $C_1$ to $C_4$ alkanediyl group; and
n is an average number of repeating units and is from 1.05 to 200.

It was surprising that a hardener comprising a bulky alkyl group in combination with silylation has a big impact on the properties of the dielectric film made thereof.

Another aspect of the present invention is the use of a resin composition as described herein for depositing an insulating film on a circuit substrate, particularly for manufacturing a printed wiring board.

Yet another aspect of the present invention relates to an insulating layer comprising the resin composition as described herein after curing said resin composition to form an insulating layer, wherein the insulating layer has a dielectric constant (also referred to as dielectric resistance) $D_k$ of 3 or below and a loss tangent $D_f$ of 0.02 or below, preferably 0.01 or below.

Yet another aspect of the present invention relates to a multilayered printed wiring board, comprising the insulating layer as described herein.

Yet another aspect of the present invention relates to a semiconductor device comprising the multilayered printed wiring board as described herein.

Yet another aspect of the present invention relates to a compound of formula C2

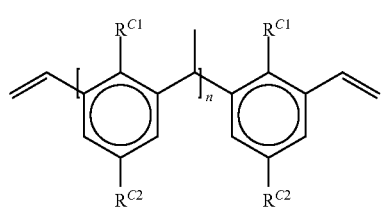
(C2)

wherein
$R^{C1}$ is
(a) a siloxane group of formula C1a

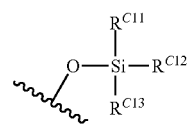
(C1a)

or (b) or both a siloxane group of formula C1a and an ester group of formula C1b

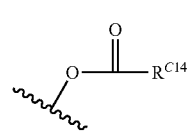
(C1b)

$R^{C2}$ is selected from a bulky $C_4$ to $C_{12}$ alkyl group comprising at least one tertiary or quaternary carbon atom;
$R^{C11}$, $R^{C12}$, $R^{C13}$ are independently selected from methyl, ethyl and 1-propyl;
$R^{C14}$ is selected from a linear or branched $C_1$ to $C_8$ alkyl;
$X^{C1}$ is selected from a divalent $C_1$ to $C_4$ alkanediyl group; and
n is an average number of repeating units and is from 1.05 to 200.

DETAILED DESCRIPTION OF THE INVENTION

The resin composition of the present invention comprises
(a) an epoxy resin,
(b) a curing agent comprising the structure of formula C1

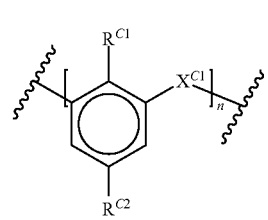
(C1)

and (c) optionally an inorganic filler;
wherein
$R^{C1}$ is
(a) a siloxane group of formula C1a

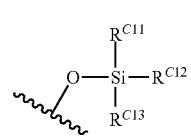
(C1a)

or (b) or both a siloxane group of formula C1a and an ester group of formula C1b

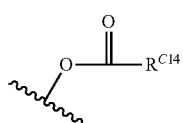
(C1b)

$R^{C2}$ is selected from a bulky $C_4$ to $C_{20}$ alkyl group comprising at least one tertiary or quaternary carbon atom;

$R^{C11}, R^{C12}, R^{C13}$ are independently selected from methyl, ethyl and 1-propyl;

$X^{C1}$ is selected from a divalent $C_1$ to $C_4$ alkanediyl group; and n is an average number of repeating units and is from 1.05 to 200.

In a particular embodiment of the present invention the resin composition essentially consists of, preferably consists of (a) an epoxy resin,
(b) a curing agent as described herein,
(c) optionally an inorganic filler,
(d) optionally a further curing agent, particularly a curing agent of formula C1, wherein $R^{C1}$ is an ester group of formula C1b as described below,
(e) optionally an alkoxy oligomer,
(f) optionally an accelerator,
(g) optionally a thermoplastic resin,
(h) optionally a rubber particle, and
(i) optionally a flame retardant.

"A" or "an" and "at least one" are used herein synonymously.

Essentially consisting of here means that other components may be mixed in the resin composition of the present invention within a range not adversely affecting the effects of the present invention. Such other components may be a thermosetting resin such as a vinyl benzyl compound, an acrylic compound, a maleimide compound, and a block isocyanate compound; an organic filler such as a silicon powder, a nylon powder, and fluorine powder; a thickener such as Orben and Bentone; a silicone-based, fluorine-based, or polymer-based defoaming agent or leveling agent; an adhesion imparting agent such as imidazole-based, thiazole-based, triazole-based, and silane-based coupling agents; and a colorant such as phthalocyanine blue, phthalocyanine green, iodine green, disazo yellow, and carbon black. Preferably the content of such other components is 1% by weight or below, particularly 0.1% by weight or below.

Epoxy Resin

The epoxy resin used in the present invention may be, but not particularly limited to, a bisphenol A type epoxy resin, a bisphenol F type epoxy resin, a bisphenol S type epoxy resin, a bisphenol AF type epoxy resin, a phenol novolac type epoxy resin, a tert-butyl-catechol type epoxy resin, a naphthol type epoxy resin, a naphthalene type epoxy resin, a naphthylene ether type epoxy resin, a glycidyl amine type epoxy resin, a cresol novolac type epoxy resin, a biphenyl type epoxy resin, an anthracene type epoxy resin, a linear aliphatic epoxy resin, an epoxy resin having a butadiene structure, an alicyclic epoxy resin, a heterocyclic epoxy resin, a Spiro ring-containing epoxy resin, a cyclohexane dimethanol type epoxy resin, a trimethylol type epoxy resin, and a halogenated epoxy resin. These may be used alone or in combination of two or more kinds thereof.

Among these, from the viewpoints of improving the dielectric properties, heat resistance and the adhesion to a metal foil, a bisphenol A type epoxy resin, a naphthol type epoxy resin, a naphthalene type epoxy resin, a biphenyl type epoxy resin, a naphthylene ether type epoxy resin, an anthracene type epoxy resin, and an epoxy resin having a butadiene structure are preferable. Specific examples thereof may include a bisphenol A type epoxy resin ("Epicoat 828EL" and "YL980" available from Mitsubishi Chemical Corporation), a bisphenol F type epoxy resin ("jER806H" and "YL983U" available from Mitsubishi Chemical Corporation), a naphthalene type difunctional epoxy resin ("HP4032", "HP4032D", "HP4032SS", and "XA4032SS" available from DIC Corporation), a naphthalene type tetrafunctional epoxy resin CH P4700" and "HP4710" available from DIC Corporation), a naphthol type epoxy resin ("ESN-475V" available from Tohto Kasei Co., Ltd.), an epoxy resin having a butadiene structure ("PB-3600" available from Daicel Chemical Industries, Ltd.), an epoxy resin having a biphenyl structure ("NC3000H", "NC3000L", and "NC3100" available from NIPPON KAYAKU Co., Ltd., and "YX4000", "YX4000H", "YX4000HK", and "YL6121" available from Mitsubishi Chemical Corporation), an anthracene type epoxy resin ("YX8800" available from Mitsubishi Chemical Corporation), and a naphthylene ether type epoxy resin ("EXA-7310", "EXA-7311", "EXA-7311L", and "EXA 7311-G3" available from DIC Corporation).

The epoxy resin may be used in combination of two or more kinds thereof. It is preferable that the epoxy resin contains an epoxy resin having two or more epoxy groups within the molecule. In particular, it is more preferable that the epoxy resin contains an aromatic epoxy resin that has two or more epoxy groups within the molecule and is liquid at a temperature of 20° C. (hereinafter referred to as "liquid epoxy resin") and an aromatic epoxy resin that has three or more epoxy groups within the molecule and is solid at a temperature of 20° C. (hereinafter referred to as "solid epoxy resin").

The epoxy resin as used in the present invention are preferably epoxy resin having an aromatic ring structure in its molecule. When a liquid epoxy resin and a solid epoxy resin are used in combination as the epoxy resin, a mixing ratio (liquid epoxy resin:solid epoxy resin) by weight preferably falls within a range of 1:0.1 to 1:2, more preferably within a range of 1:0.3 to 1:1.8, and still more preferably within a range of 1:0.6 to 1:1.5, from the viewpoints of the resin composition being moderately flexible when used in a form of adhesive film and a cured product of the resin composition having an appropriate breaking strength.

If oligomers are used it is preferred to use a low degree or polymerization, preferably a degree of polymerization below 10, more preferably a degree of polymerization below 5, most preferably a degree of polymerization below 3.

It is most preferred to use epoxy resins with essentially no OH groups in the molecule which is the ideal case if the epoxy resin consists only of monomeric units. Therefore, epoxy resins are preferred to have a content of monomeric units of at least 50% by weight, more preferably 80% by weight, most preferably 90% by weight.

As used herein, "degree of polymerization" means the arithmetic average number of monomers in an oligomeric or polymeric epoxy resin.

The following bifunctional epoxy resins are particularly preferred:

MPPG from BASF

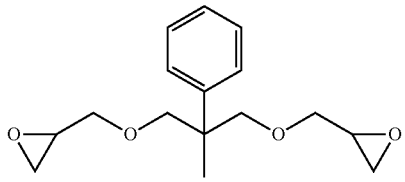 [SMILES: CC(COCC1CO1)(COCC1CO1)c1ccccc1]

and DER332 from DOW Chemicals

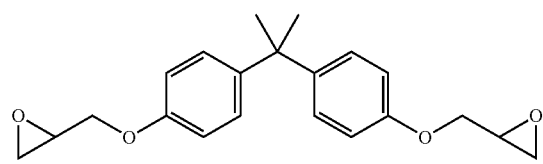 [SMILES: CC(C)(c1ccc(OCC2CO2)cc1)c1ccc(OCC2CO2)cc1]

The following multifunctional epoxy resins with 3 or more epoxy groups are particularly preferred:

EPICOLON HP 4710 from DIC

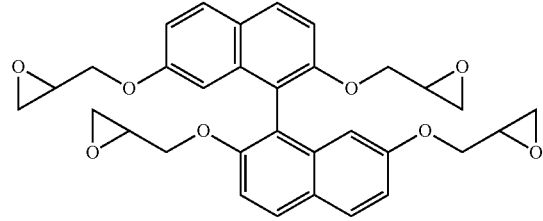 [SMILES: c1cc2ccc(OCC3CO3)c(-c3c(OCC4CO4)ccc4ccc(OCC5CO5)cc34)c2cc1OCC1CO1]

DEN438 from DOW Chemicals

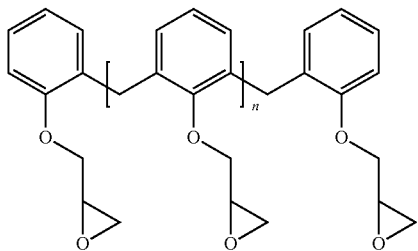

EPPN-501 HY from Nippon Kayaku

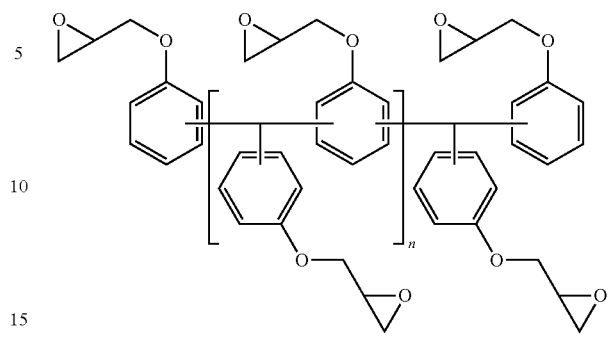

NC3000L/NC3000H from Nippon Kayaku

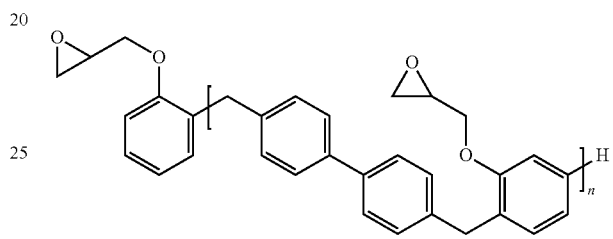

and EpiCOLON N673 80M/EPICOLON N680 75M from DIC

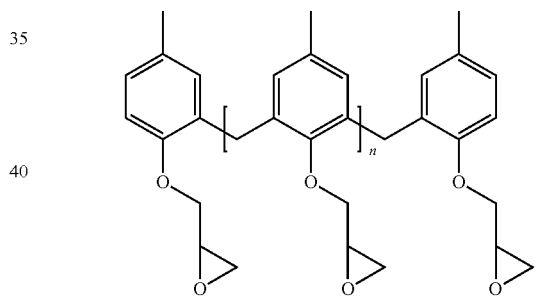

Curing Agent

The resin composition of the present invention further comprises a curing agent comprising a curing agent of formula C1 (also referred to herein as "bulky alkyl curing agent") which improves the insulating properties and mechanical characteristics of the dielectric film.

The bulky alkyl curing agent according to the present invention, comprises the structure of formula C1

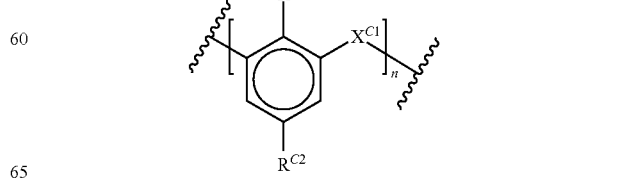

(C1)

Herein, $R^{C1}$ is
(a) a siloxane group of formula C1a

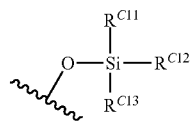

(C1a)

or (b) or both a siloxane group of formula C1a and an ester group of formula C1b

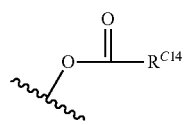

(C1b)

wherein $R^{C11}$, $R^{C12}$, $R^{C13}$ may be the same or different, preferably the same, and are selected from methyl, ethyl and 1-propyl, preferably methyl and ethyl, most preferably ethyl; and $R^{C14}$ is selected from a linear or branched $C_1$ to $C_8$ alkyl, preferably a $C_1$ to $C_6$ alkyl, most preferably a $C_1$ to $C_4$ alkyl or a branched $C_3$ to $C_8$ alkyl, preferably a $C_3$ to $C_6$ alkyl.

It needs to be emphasized that the resin composition may also comprise a further curing agent.

In embodiment (a) above only siloxane substituents are present in the molecule. In embodiment (b) above the siloxane group and the ester group are present in one sort of curing agent, i.e. in one molecule. The siloxane group and the ester group may be arranged in the curing agent in any order, i.e. in block, alternating or random order.

In formula C1 the substituent $R^{C2}$ is a bulky $C_4$ to $C_{12}$ alkyl group that comprises at least one tertiary or quaternary carbon atom, preferably a quaternary carbon atom. When counting the substituents, the carbon atom of the phenyl ring $R^{C2}$ is attached to is to be included.

It has been found that bulky $C_4$ to $C_{20}$ alkyl groups lead to better dielectric properties.

In a first embodiment $R^{C2}$ may be a $C_4$ to $C_{12}$ branched alkyl group, preferably a $C_4$ to $C_8$ branched alkyl group, such as but not limited to t-butyl; 1,1-dimethyl propyl; 2,2-dimethyl propyl; 2,2-dimethyl butyl; 3,3-dimethyl butyl; or 1,1,3,3-tetramethyl butyl.

In a second embodiment $R^{C2}$ may be a C6 to C12 cycloalkyl group, such as but not limited to cyclohexyl, Tricyclo[3.3.1.1$^{3,7}$]decyl (adamantly), and norbornyl.

In formula C1 the bridging group $X^{C1}$ is selected from a divalent $C_1$ to $C_4$ alkanediyl group, preferably from methanediyl, ethanediyl, or propanediyl, most preferably from an 1,1 or 1,2 ethanediyl.

In formula C1 n is an average number of repeating units and is from 1.05 to 200, preferably from 1.5 to 100, even more preferably from 2 to 50, most preferably from 3 to 20.

"Average number of repeating units" here means that the polymeric curing agents are not monodisperse systems, but always have a distribution of molar masses (for examples oligomers ranging from 2-6 repeating units). The average number of repeating units is the average amount of repeating units per average polymer-molecule. Like the molecular weight, the average numbers n and m is either known from the precursors or may be determined by GPC analysis of the curing agent or its precursors.

The weight average molecular weight of the curing agent is not particularly limited, it is preferably 400 to 20 000 g/mol, more preferably 400 to 10 000 g/mol, most preferably 400 to 5 000 g/mol.

The curing process of the epoxy resins can be performed under standard conditions e.g. at 180° C. for several hours with the use of an accelerator as described below.

Generally, the bulky alkyl curing agents according to the present invention may be prepared from the respective phenol-type curing agents available in the market by silylation according to:

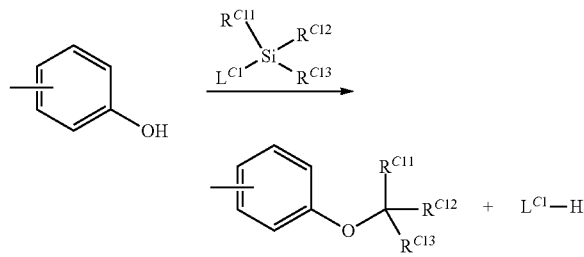

under acidic or basic conditions, wherein $L^{C1}$ is selected from $C_1$ to $C_6$ alkoxy and halogenide, preferably methoxy, ethoxy and Cl, most preferably Cl.

Preferred are the following bulky alkyl curing agents
  (a) Silylated Koresin®-type curing agents; Koresin® is available from BASF;
  (b) Silylated tackifiers like SP1068; SP1068 is available from S.I. group.

Particularly preferred bulky alkyl curing agents are those of formula C2

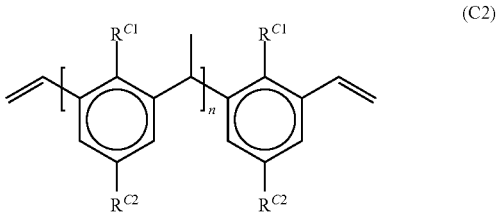

(C2)

wherein
  $R^{C1}$ is
  (a) a siloxane group of formula C1a

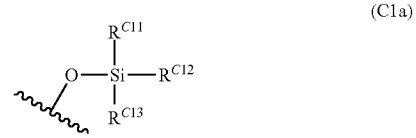

(C1a)

or (b) or both a siloxane group of formula C1a and an ester group of formula C1b

(C1b)

wherein $R^{C11}$, $R^{C12}$, $R^{C13}$ may be the same or different, preferably the same, and are selected from methyl, ethyl and 1-propyl, preferably methyl and ethyl, most preferably ethyl; and $R^{C14}$ is selected from a linear or branched $C_1$ to $C_8$ alkyl, preferably a $C_1$ to $C_6$ alkyl, most preferably a to $C_4$ alkyl or a branched $C_3$ to $C_8$ alkyl, preferably a $C_3$ to $C_6$ alkyl; $R^{C2}$ is selected from a bulky $C_4$ to $C_{12}$ alkyl group comprising at least one tertiary or quarternary carbon atom; $R^{C1}$, $R^{C12}$, $R^{C13}$ are independently selected from methyl, ethyl and 1-propyl; $X^{C1}$ is selected from a divalent $C_1$ to $C_4$ alkanediyl group; and n is an average number of repeating units and is from 1.05 to 200.

The preferred ranges are the same as describe above with respect to formula Cl above.

Like other curing agents, a precondition for the selection of the bulky alkyl curing agent is its compatibility with the epoxy resin, it must be able to form a homogenic mixture with the epoxy resin and must not lead to phase separation.

Inorganic Filler

The inorganic filler used in the present invention is not particularly limited. Examples thereof may include silica, alumina, barium sulfate, talc, clay, a mica powder, aluminum hydroxide, magnesium hydroxide, calcium carbonate, magnesium carbonate, magnesium oxide, boron nitride, aluminum borate, barium titanate, strontium titanate, calcium titanate, magnesium titanate, bismuth titanate, titanium oxide, barium zirconate, and calcium zirconate. Among these, silica is preferable. Further, silica such as amorphous silica, pulverized silica, fumed silica, crystalline silica, synthetic silica and hollow silica are preferable, and fumed silica is more preferable. Spherical silica is preferable as the silica. The silica may be used as such but may also be surface modified. These may be used alone or in combination of two or more kinds thereof.

The average particle diameter of the inorganic filler is not particularly limited. From the viewpoint of forming a fine wiring on an insulating layer, the upper limit of the average particle diameter of the inorganic filler is preferably 5 micrometer or less, more preferably 3 micrometer or less, still more preferably 1 micrometer or less, yet still more preferably 0.7 micrometer or less, particularly preferably 0.5 micrometer or less. On the other hand, the lower limit of the average particle diameter of the inorganic filler is preferably 0.01 micrometer or more, more preferably 0.03 micrometer or more, still more preferably 0.05 micrometer or more, yet still more preferably 0.07 micrometer or more, and particularly preferably 0.1 micrometer or more, from the viewpoint that, when forming a resin composition varnish from an epoxy resin composition, a reduction of the handleability due to an increase in the viscosity of the varnish can be prevented. The average particle diameter of the inorganic filler can be measured by a laser diffraction and scattering method on the basis of the Mie scattering theory. Specifically, the particle size distribution of the inorganic filler is prepared on the volume basis using a laser diffraction particle size distribution measuring device, and a median diameter thereof can be measured as an average particle diameter. As a measurement sample, there can be preferably used a dispersion in which the inorganic filler is dispersed in water by ultrasonification. As the laser diffraction particle size distribution measuring device, LA-500, 750, and 950 manufactured by Horiba, Ltd., or the like can be used.

Although the content of the inorganic filler varies depending upon characteristics required for the resin composition, it is preferably from 20 to 85% by weight, more preferably from 30 to 80% by weight, still more preferably from 40 to 75% by weight, and yet still more preferably from 50 to 70% by weight when a content of non-volatile components in the resin composition is defined as 100% by weight. When the content of the inorganic filler is too small, the thermal expansion coefficient of the cured product tends to be high. When the content is too large, there is a tendency that the cured product becomes brittle and the peel strength is lowered.

The method for preparing the resin composition of the present invention is not particularly limited, and examples thereof may include a method of mixing blending components using a rotary mixer or the like with, if necessary, a solvent or the like.

Application

The application of the resin composition of the present invention is not particularly limited. The resin composition can be used over a wide range of application where the resin composition is required, including an insulating resin sheet such as an adhesive film and a prepreg, a circuit substrate (applications for a laminate, a multilayered printed wiring board, etc.), a solder resist, an under fill material, a die bonding material, a semiconductor sealing material, a hole plugging resin, and a module-embedding resin. Among these, the resin composition of the present invention can be suitably used as a resin composition for forming an insulating layer in the manufacture of the multilayered printed wiring board (resin composition for an insulating layer of a multi-layered printed wiring board). Furthermore, the resin composition of the present invention can be suitably used as a resin composition for forming an insulating layer on which a conductive layer is formed by plating in the manufacture of the multi-layered printed wiring board (resin composition for an insulating layer of a multilayered printed wiring board on which a conductive layer is formed by plating). Although the resin composition of the present invention can be applied to a circuit substrate in a varnish state to form an insulating layer, it is industrially preferable, in general, to use the resin composition in a form of a sheet-shaped laminated material such as an adhesive film and a prepreg. From the viewpoint of lamination properties of the sheet-shaped laminated material, the softening point of the resin composition is preferably 40 to 150° C.

Due to the trend towards digital connectivity and 5G technology, special dielectric polymers with particularly low dielectric constant $D_k$ and loss tangent $D_f$ are needed to meet the 5G material specification focused on 5G applications. In particular, low dielectric constant and low loss polymers are required for but are not limited to:
- antenna modules
- personal computers
- mobile telephones
- electrical components and antenna substrates
- electrothermal circuit (ETC).

Other Components

Further additive may be present in the composition according to the present invention as described below.

Additional Curing Agents

The bulky alkyl compound may also be used in combination with other known curing agents. In one preferred embodiment the bulky alkyl curing agent according to the invention as the only curing agent. In another preferred embodiment the bulky alkyl curing agent according to the invention is used in combination with at least one of the curing agent described below. If used in combination the amount of the bulky alkyl curing agents is from 20% to 99% by weight, preferably from 30 to 90% by weight, most preferably from 50 to 90% by weight.

In a particular embodiment a curing agent of formula C1 may be used, wherein $R^{C1}$ is an ester group of formula C1b

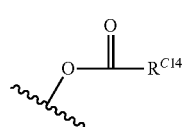
(C1b)

is used in combination with the curing agent according to the invention. Herein $R^{C14}$ is selected from a linear or branched $C_1$ to $C_8$ alkyl, preferably a $C_1$ to C6 alkyl, most preferably a $C_1$ to $C_4$ alkyl or a branched $C_3$ to $C_8$ alkyl, preferably a $C_3$ to $C_6$ alkyl. In contrast to the curing agent according to the invention, this ester groups are not present in the same but in separate molecules.

As an alternative to the ester group Cl b, an ether group, such as but not limited to methoxymethyl ether group, tetrahydropyranyl ether group, t-butyl ether allyl ether group, benzyl ether group may be used.

Furthermore, the additional curing agent may be, but is not particularly limited to, a phenol-based curing agent, a naphthol-based curing agent, a benzoxazine-based curing agent, a cyanate ester-based curing agent, and an acid anhydride-based curing agent. From the viewpoints of improving the dielectrical properties like loss tangent $D_f$ or dielectrical constant $D_k$, a phenol-based curing agent, a naphthol-based curing agent is preferred. Besides the bulky alkyl curing agent according to the invention, these may be used alone or in combination of two or more kinds thereof.

The phenol-based curing agent and the naphthol based curing agent may include, but not particularly limited to, a phenol-based curing agent having a novolac structure and a naphthol-based curing agent having a novolac structure. A phenol novolac resin, a triazine skeleton-containing phenol novolac resin, a naphthol novolac resin, a naphthol aralkyl type resin, a triazine skeleton-containing naphthol resin, and a biphenyl aralkyl type phenol resin are preferable. A commercially available biphenyl aralkyl type phenol resin may be "MEH-7700", "MEH-7810", "MEH-7851", and "MEH7851-4H" (available from Meiwa Plastic Industries, Ltd.) and "GPH" (available from NIPPON KAYAKU Co., Ltd.), a commercially available naphthol novolac resin may be "NH N" and "CBN" (available from NIPPON KAYAKU Co., Ltd.), a commercially available naphthol aralkyl type resin may be "SN170", "SN180", "SN190", "SN475", "SN485", "SN495", "SN395", and "SN375" (available from Tohto Kasei Co., Ltd.), a commercially available phenol novolac resin may be "TD2090" (available from DIC Corporation), and a commercially available triazine skeleton-containing phenol novolac resin may be "LA3018", "LA7052", "LA 7054", and "LA1356" (available from DIC Corporation). Besides the bulky alkyl curing agents, these may be used alone or in combination of two or more kinds thereof.

Although the active ester-based curing agent is not particularly limited, a compound having two or more highly reactive ester groups within the molecule is generally preferably used, such as phenol esters, thiophenol esters, N-hydroxyamine esters, and esters of heterocyclic hydroxy compounds. The active ester-based curing agent is preferably obtained by condensation reaction of a carboxylic acid compound and/or a thiocarboxylic acid compound with a hydroxy compound and/or a thiol compound. In particular, from the viewpoint of improving the heat resistance, an active ester-based curing agent obtained from a carboxylic acid compound and a hydroxy compound is preferable, and an active ester-based curing agent obtained from a carboxylic acid compound and a phenol compound and/or naphthol compound is more preferable. Examples of the carboxylic acid compound may include benzoic acid, acetic acid, succinic acid, maleic acid, itaconic acid, phthalic acid, isophthalic acid, terephthalic acid, and pyromellitic acid. Examples of the phenol compound or naphthol compound may include hydroquinone, resorcinol, bisphenol A, bisphenol F, bisphenol S, phenolphthalin, methylated bisphenol A, methylated bisphenol F, methylated bisphenol S, phenol, o-cresol, m-cresol, p-cresol, catechol, a-naphthol, ~-naphthol, 1,5-dihydroxynaphthalene, 1,6-dihydroxy-naphthalene, 2,6-dihydroxynaphthalene, dihydroxybenzophenone, trihydroxybenzophenone, tetrahydroxybenzophenone, phloroglucin, benzenetriol, dicyclopentadienyl diphenol, and phenol novolac. The active ester-based curing agents can be used alone or in combination of two or more kinds. As the active ester-based curing agent, the active ester-based curing agent disclosed in IP-A-2004-277460, which is incorporated herein by reference in its entirety, may be used, or a commercially available active ester-based curing agent may be used. The commercially available active ester-based curing agent is preferably an active ester-based curing agent containing a dicyclopentadienyl diphenol structure, an acetylated material of phenol novolac, or a benzoylated material of phenol novolac. Among these, an active ester curing-based agent containing a dicyclopentadienyl diphenol structure is more preferable.

Specifically, the active ester-based curing agent containing a dicyclopentadienyl diphenol structure may be EXB9451, EXB9460, EXB9460S-65T, and HPC-8000-65T (available from DIC Corporation, active group equivalent weight: about 223), the acetylated material of phenol novo lac may be DC808 (available from JER Co., Ltd., active group equivalent weight: about 149), and the benzoylated material of phenol novolac may be YLH1026 (available from JER Co., Ltd., active group equivalent weight: about 200), YLH1030 (available from JER Co., Ltd., active group equivalent weight: about 201), and YLH1048 (available from JER Co., Ltd., active group equivalent weight: about 245). Among these, from the viewpoints of the storage stability of the varnish and the thermal expansion coefficient of the cured product, EXB9460S is preferable.

More specifically, the active ester-based compound containing a dicyclopentadienyl diphenol structure may be a compound of the following formula C61.

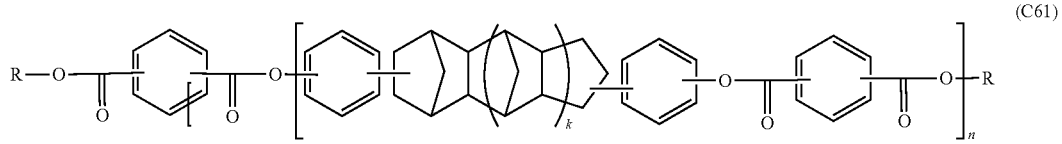
(C61)

In the formula C61, R is a phenyl group or a naphthyl group, k represents 0 or 1, and n is an average number of repeating units and is 0.05 to 2.5. From the viewpoints of reducing the dielectric properties and improving the heat resistance, R is preferably a naphthyl group, k is preferably 0, and n is preferably 0.25 to 1.5.

Specific examples of the benzoxazine-based curing agent may include, but not particularly limited to, F-a and P-d (available from Shikoku Chemicals Corporation) and HFB2006M (available from Showa High Polymer Co., Ltd.).

Examples of the cyanate ester-based curing agent may include, but not particularly limited to, a novo lac type (phenol novolac type, alkyl phenol novolac type, etc.) cyanate ester-based curing agent, a dicyclopentadiene type cyanate ester-based curing agent, a bisphenol type (bisphenol A type, bisphenol F type, and bisphenol S type, etc.) cyanate esterbased curing agent, and a prepolymer in which these curing agents are partly triazinized. Although the weight average molecular weight of the cyanate ester-based curing agent is not particularly limited, it is preferably 500 to 4500, and more preferably 600 to 3000. Specific examples of the cyanate ester-based curing agent may include: A difunctional cyanate resin such as bisphenol A dicyanate, polyphenol cyanate (oligo(3-methylene-1,5-phenylenecyanate), 4,4'-methylenebis-(2,6-dimethylphenyl cyanate), 4,4'-ethylidenediphenyl dicyanate, hexafluorobisphenol A dicyanate, 2,2-bis(4-cyanate)phenylpropane, 1,1-bis(4-cyanatephenylmethane), bis(4-cyanate-3,5-dimethylphenyl) methane, 1,3-bis(4-cyanatephenyl-1-(methylethylidene)) benzene, bis(4-cyanatephenyl) thioether, and bis(4-cyanatephenyl)ether; a polyfunctional cyanate resin derived from a phenol novolac, cresol novo lac, or dicyclopentadiene structure-containing phenol resin or the like; and a prepolymer in which these cyanate esters are partly triazinized. These may be used alone or in combination of two or more kinds thereof. A commercially available cyanate ester resin may be a phenol novolac type polyfunctional cyanate ester resin represented by the following formula (C62) (available from Lonza Japan Ltd., PT30, cyanate equivalent weight: 124), a prepolymer in which bisphenol A dicyanate is partly or entirely triazinized to form a trimer, represented by the following formula (C63) (available from Lonza Japan Ltd., BA230, cyanate equivalent weight: 232), and a dicyclopentadiene structure-containing cyanate ester resin represented by the following formula (C64) (available from Lonza Japan Ltd., DT-4000 and DT-7000).

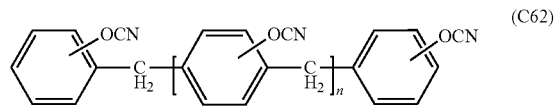
(C62)

In formula C62, n represents an arbitrary number (preferably 0 to 20) as an average value.

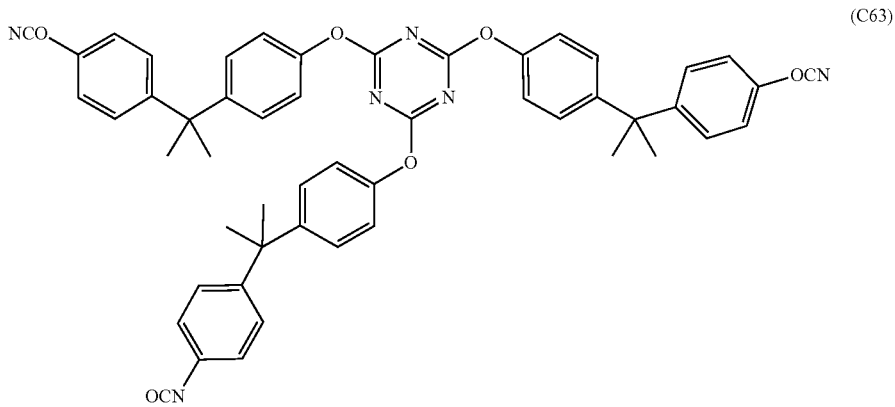
(C63)

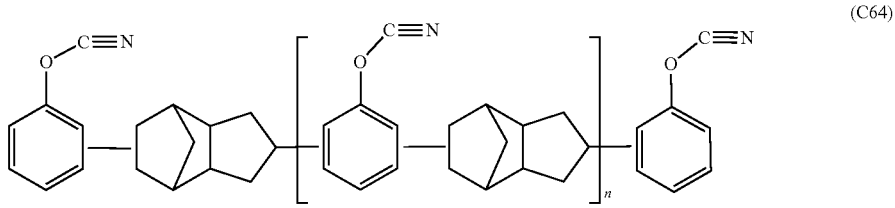
(C64)

In formula C64, n represents a number of 0 to 5 as an average value.

The acid anhydride-based curing agent may be, but not particularly limited to, phthalic anhydride, tetrahydrophthalic anhydride, hexahydrophthalic anhydride, methyltetrahydrophthalic anhydride, methylhexahydrophthalic anhydride, methyl nadic anhydride, hydrogenated methyl nadic anhydride, trialkyltetrahydrophthalic anhydride, dodecenyl succinic anhydride, 5-(2,5-dioxotetrahydro-3-furanyl)-3-methyl-3-cyclohexene-1,2-dicarboxylic anhydride, trimellitic anhydride, pyromellitic anhydride, benzophenone tetracarboxylic dianhydride, biphenyl tetracarboxylic dianhydride, naphthalene tetracarboxylic dianhydride, oxydiphthalic dianhydride, 3,3'-4,4'-diphenylsulfone tetracarboxylic dianhydride, 1,3,3a,4,5,9b-hexahydro-5-(tetrahydro 2,5-dioxo-3-furanyl)-naphto[1,2-c]furan-l, 3-dione, ethylene glycol bis(anhydrotrimellitate), and a polymer type acid anhydride such as a styrene-maleic acid resin obtained by copolymerization of styrene and maleic acid.

In the resin composition of the present invention, from the viewpoints of improving the mechanical strength and water resistance of the cured product of the resin composition, the ratio of the total number of epoxy groups in the epoxy resin to the total number of reactive groups in the curing agent (E) is preferably 1:0.2 to 1:2, more preferably 1:0.3 to 1:1.5, and still more preferably 1:0.4 to 1:1. The total number of epoxy groups in the epoxy resin in the resin composition is a value obtained by dividing the mass of solid content in each epoxy resin by respective epoxy equivalent weights and summing the calculated values for all epoxy resins. The total number of reactive groups in the curing agent is a value obtained by dividing the mass of solid content in each curing agent by respective reactive group equivalent weights and summing the calculated values for all curing agents.

Alkoxy Oligomer

An alkoxy oligomer as described in US 2014/087152 A may advantageously be used in the composition according to the invention. An alkoxy oligomer refers to a low molecular resin having both an organic group and an alkoxysilyl group, and may be, not particularly limited to, a methyl group-containing alkoxysilyl resin, a phenyl group-containing alkoxysilyl resin, an epoxy group containing alkoxysilyl resin, a mercapto group-containing alkoxysilyl resin, an amino group-containing alkoxysilyl resin, an acrylic group-containing alkoxysilyl resin, a methacrylic group-containing alkoxysilyl resin, a ureido groupcontaining alkoxysilyl resin, an isocyanate group-containing alkoxysilyl resin, and a vinyl group-containing alkoxysilyl resin. Among these, an epoxy group-containing alkoxysilyl resin, a mercapto group-containing alkoxysilyl resin, and an amino group-containing alkoxysilyl resin are preferable, and an amino group-containing alkoxysilyl resin is more preferable. These may be used alone or in combination of two or more kinds thereof. The alkoxy oligomer may have one kind or two or more kinds of organic groups.

Specifically, the alkoxy oligomer may be a glycidoxypropyl group-containing alkoxysilyl resin, an aminopropyl group-containing alkoxysilyl resin, an N-2-(aminoethyl)-3-aminopropyl group-containing alkoxysilyl resin, an N-phenyl-3-aminopropy I group-containing alkoxysily I resin, a methacryloxypropyl group-containing alkoxysilyl resin, an acryloxypropyl group-containing alkoxysilyl resin, a mercaptopropyl group-containing alkoxysilyl resin, a ureidopropyl group-containing alkoxysilyl resin, and isocyanatopropyl group-containing alkoxysilyl resin. Among them, a glycidoxypropyl group-containing alkoxysilyl resin, an aminopropyl group-containing alkoxysilyl resin, an N-2-(aminoethyl)-3-aminopropyl group-containing alkoxysilyl resin, an N-phenyl-3-aminopropy I group-containing alkoxysily I resin, and a mercaptopropyl group-containing alkoxysilyl resin are preferable, a 3-aminopropyl group-containing alkoxysilyl resin, an N-2-(aminoethyl)-3-aminopropyl group-containing alkoxysilyl resin, and an N-phenyl-3-aminopropyl groupcontaining alkoxysilyl resin are more preferable, and an N-phenyl-3-aminopropyl group-containing alkoxysilyl resin is still more preferable.

More specifically, the alkoxy oligomer may be a glycidoxypropyl group-containing methoxysilyl resin, an aminopropyl group-containing methoxysilyl resin, an aminopropyl group-containing ethoxysilyl resin, an N-2-(aminoethyl)-3-aminopropyl group-containing methoxysilyl resin, an N-phenyl-3-aminopropy I group-containing methoxysilyl resin, a methacryloxypropyl group-containing methoxysilyl resin, an acryloxypropyl group-containing methoxysilyl resin, a mercaptopropyl group-containing methoxysilyl resin, a ureidopropyl group-containing ethoxysilyl resin, and an isocyanatopropyl group-containing ethoxysilyl resin. Among them, a glycidoxypropyl group-containing methoxysilyl resin, an aminopropyl group-containing methoxysilyl resin, an aminopropyl group-containing ethoxysilyl resin, an N-2-(aminoethy 1)-3-aminopropy I group-containing methoxysilyl resin, an N-phenyl-3-aminopropyl group-containing methoxysilyl resin, and a mercaptopropyl group-containing methoxysilyl resin are preferable, a 3-aminopropyl groupcontaining methoxysilyl resin, a 3-aminopropyl group-containing ethoxysilyl resin, an N-2-(aminoethyl)-3-aminopropy I group-containing methoxysily I resin, and an N-phenyl-3-aminopropyl group-containing methoxysilyl resin are more preferable, and an N-phenyl-3-aminopropyl group-containing methoxysilyl resin is still more preferable.

More specifically, the alkoxy oligomer can be represented by a structure of the following formula (O1).

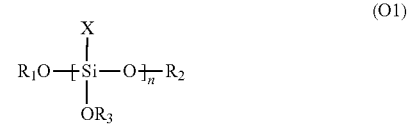

In formula (O1), $R^1$ $R^2$ and $R^3$ are each independently a linear or branched alkyl group having 1 to 10 carbon atoms, preferably a linear or branched alkyl group having 1 to 5 carbon atoms, more preferably a linear or branched alkyl group having 1 to 4 carbon atoms, still more preferably a methyl group, an ethyl group, a propyl group, an isopropyl group, a 1-methylpropyl group, a butyl group, an isobutyl group or a tert-butyl group, yet still more preferably a methyl group, an ethyl group, a propyl group or an isopropyl group, and particularly preferably a methyl group or an ethyl group. A plurality of $R^3$ may be the same as or different from each other. In the formula (1), X is a lower alkyl group, a glycidoxyalkyl group, an aminoalkyl group, a mercaptoalkyl group, an acryloxyalkyl group, a methacryloxyalkyl group, a ureidoalkyl group, an isocyanatoalkyl group, or a vinylalkyl group. X is preferably a glycidoxypropyl group, an aminopropyl group, an N-2-(aminoethyl)-3-aminopropyl group, an N-phenyl-3-aminopropyl group, a methacryloxypropyl group, an acryloxypropyl group, a mercaptopropyl group, a ureidopropyl group or an isocyanatopropyl group, more preferably a glycidoxypropyl group, an aminopropyl group, an N-2-(aminoethyl)-3-aminopropyl group, an N-phenyl-3-aminopropyl group or a mercaptopropyl group, still more preferably a 3-aminopropyl group, an N-2-(aminoethyl)-3-aminopropyl group or an N-phenyl-3-aminopropyl group, and yet still more preferably an N-phenyl-3-aminopropyl group. X may be one kind or two or more kinds. Thus, a plurality of X may be the same as or different from each other.

In the formula (O1), n is an integer of 2 to 10, preferably an integer of 2 to S, more preferably an integer of 2 to 6, and still more preferably an integer of 3 to 5.

Accelerator

When the resin composition of the present invention further contains an accelerator (also referred to as catalyst), the epoxy resin and the curing agent can be efficiently cured. The accelerator may be, but not particularly limited to, an amine-based accelerator, a guanidine-based accelerator, an imidazole-based accelerator, a phosphonium-based accelerator, and a metal-based accelerator. These may be used alone or in combination of two or more kinds thereof.

The amine-based accelerator may be, but not particularly limited to, trialkylamines such as triethylamine and tributylamine; and amine compounds such as 4-dimethylaminopyridine, benzyldimethylamine, 2,4,6-tris (dimethylaminomethyl) phenol, and 1,8-diazabicyclo[S,4,0]-undecane (hereinafter abbreviated as DBU). These may be used alone or in combination of two or more kinds thereof.

The guanidine-based accelerator may be, but not particularly limited to, dicyandiamide, 1-methylguanidine, 1-ethylguanidine, 1-cyclohexylguanidine, 1-phenylguanidine, 1-(o-tolyl)-guanidine, dimethyl guanidine, diphenylguanidine, trimethylguanidine, tetramethylguanidine, pentamethylguanidine, 1,5,7-triazabicyclo[4.4.0]dec-5-ene, 7-methyl-1,5,7-triazabicyclo-[4.4.0]dec-5-ene, 1-methylbiguanide, 1-ethylbiguanide, 1-n-butylbiguanide, 1-n-octadecyl-biguanide, 1,1-dimethylbiguanide, 1,1-diethylbiguanide, 1-cyclohexylbiguanide, 1-allylbiguanide, 1-phenylbiguanide, and 1-(o-tolyl)biguanide. These may be used alone or in combination of two or more kinds thereof.

The imidazole-based accelerator may be, but not particularly limited to, an imidazole compound such as 2-methylimidazole, 2-undecylimidazole, 2-heptadecylimidazole, 1,2-dimethylimidazole, 2-ethyl-4-methylimidazole, 1,2-dimethylimidazole, 2-ethy 1-4-methylimidazole, 2-phenylimidazole, 2-pheny 1-4-methylimidazole, 1-benzyl-2-methylimidazole, 1-benzyl-2-phenylimidazole, 1-cyanoethyl-2-methylimidazole, 1-cyanoethyl-2-undecylimidazole, 1-cyano-ethyl-2-ethyl-4-methylimidazole, 1-cyanoethyl-2-phenylimidazole, 1-cyanoethyl-2-undecylimidazolium trimellitate, 1-cyanoethyl-2-phenylimidazolium trimellitate, 2,4-diamino-6-[2'-methylimidazolyl-(1')]-ethyl-s-triazine, 2,4-diamino-6-[2'-undecylimidazolyl-(1')] ethyl-s-triazine, 2,4-diamino-6-[2'-ethyl-4'-methylimidazolyl-(1')]-ethyl-s-triazine, a 2,4-diamino-6-[2'-methyl-imidazolyl-(1')]-ethyl-s-triazine isocyanuric acid adduct, a 2-phenylimidazole isocyanuric acid adduct, 2-phenyl-4,5-dihydroxymethylimidazole, 2-phenyl-4-methy 1-5-hydroxymethy limidazole, 2,3-dihydro-1H-pyrrolo [1,2-a] benzimidazole, 1-dodecyl-2-methyl-3-benzylimidazolium chloride, 2-methylimidazoline, and 2-phenylimidazoline, and an adduct of an imidazole compound and an epoxy resin. These may be used alone or in combination of two or more kinds thereof.

The phosphonium-based accelerator may be, but not particularly limited to, triphenylphosphine, a phosphonium borate compound, tetraphenylphosphonium tetraphenylborate, n-butyl-phosphonium tetraphenylborate, tetrabutylphosphonium decanoate, (4-methylphenyl) triphenyl-phosphonium thiocyanate, tetraphenylphosphonium thiocyanate, and butyltriphenyl-phosphonium thiocyanate. These may be used alone or in combination of two or more kinds thereof.

The content of the accelerator (except for metal based accelerator) in the resin composition of the present invention is preferably within a range of 0.005 to 1% by weight, and more preferably within a range of 0.01 to 0.5% by weight, when the content of non-volatile components in the resin composition is defined as 100% by weight. When the content of the accelerator is less than 0.005% by weight, there is a tendency that the curing becomes slow and a long thermal curing time is required. When the content of the accelerator exceeds 1% by weight, there is a tendency that the storage stability of the resin composition is lowered.

The metal-based accelerator may be, but not particularly limited to, organic metal complexes and organic metal salts of a metal such as cobalt, copper, zinc, iron, nickel, manganese, and tin. Specific examples of the organic metal complex may include an organic cobalt complex such as cobalt (II) acetylacetonate and cobalt (III) acetylacetonate, an organic copper complex such as copper (II) acetylacetonate, an organic zinc complex such as zinc (II) acetylacetonate, an organic iron complex such as iron (III) acetylacetonate, an organic nickel complex such as nickel (II) acetylacetonate, and an organic manganese complex such as manganese (II) acetyl-acetonate. The organic metal salt may be zinc octoate, tin octoate, zinc naphthenate, cobalt naphthenate, tin stearate, and zinc stearate. These may be used alone or in combination of two or more kinds thereof.

Regarding the addition amount of the metal-based accelerator in the resin composition of the present invention, a content of metal derived from the metal-based curing catalyst is preferably within a range of 25 to 500 ppm, and more preferably within a range of 40 to 200 ppm, when a content of non-volatile components in the resin composition is defined as 100% by weight. When the content of the metal is less than 25 ppm, it tends to be difficult to form a conductive layer having an excellent adhesion property on an insulating layer surface with low arithmetic mean roughness. When the content of the metal exceeds 500 ppm, the storage stability and insulating properties of the resin composition tend to be lowered.

Particularly preferred accelerators are

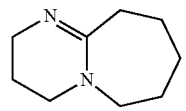 [SMILES: C1CCC2=NCCCN2CC1]

available under the tradename Lupragen™ N700 from BASF SE, and EMIM DCA:

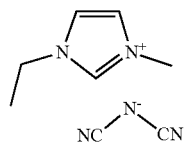

available under the trade name Basionics™ VS 3 from BASF SE.

Thermoplastic Resin

When the resin composition of the present invention further contains a thermoplastic resin, the mechanical strength of the cured product can be improved. Furthermore, in the case of using the resin composition in a form of adhesive film, the film molding capability can also be improved. Such a thermoplastic resin may be a phenoxy resin, a polyimide resin, a polyamideimide resin, a polyetherimide resin, a polysulfone resin, a polyethersulfone resin, a polyphenylene ether resin, a polycarbonate resin, a polyetherether ketone resin, and a polyester resin. These thermoplastic resins may be used alone or in combinations of two or more kinds thereof. The weight average molecular weight of the thermoplastic resin is preferably within a range of 5 000 to 200 000. When the weight average molecular weight is less than this range, the effects for improving the film molding capability and the mechanical strength are unlikely to be sufficiently exhibited. When the weight average molecular weight is more than this range, the compatibility with the cyanate ester resin and the naphthol-type epoxy resin is not sufficient, the surface irregularity after curing is increased, and the formation of a high-density fine wiring tends to be difficult. The weight average molecular weight in the present invention is measured by a gel permeation chromatography (GPC) method (in terms of polystyrene). Specifically, in the GPC method, the weight average molecular weight can be determined at a column temperature of 40° C. using LC-9A1R1D-6A manufactured by Shimadzu Corporation as a measurement apparatus, Shodex K-800P/K-804L1K-804L manufactured by Showa Denko K.K. as columns, and chloroform or the like as a mobile phase, and carrying out calculation using a calibration curve of standard polystyrene.

When the thermoplastic resin is mixed in the resin composition of the present invention, the content of the thermoplastic resin in the resin composition is not particularly limited, and is preferably 0.1 to 10% by weight, and more preferably from 1 to 5% by weight, relative to 100% by weight of non-volatile components in the resin composition. When the content of the thermoplastic resin is too small, the effects for improving the film molding capability and the mechanical strength are unlikely to be exhibited. When the content of the thermoplastic resin is too large, there is a tendency that the melt viscosity is increased and the arithmetic mean roughness of the surface of the insulating layer after the wet roughening step is increased.

Rubber Particle

When the resin composition of the present invention further contains a rubber particle, the plating peel strength can be improved, and effects for improving the drill processing properties, reducing the dielectric dissipation factor, and relieving the stress can be obtained. The rubber particle which can be used in the present invention is, for example, one that is insoluble in an organic solvent used for the preparation of a varnish of the resin composition and incompatible with the epoxy resin. Therefore, the rubber particle is present in a dispersed state in the varnish of the resin composition of the present invention. In general, such a rubber particle can be prepared by increasing the molecular weight of the rubber component to such an extent that the rubber component is insoluble in the organic solvent and the resin, and converting it into a granular state.

Preferable examples of the rubber particle which can be used in the present invention may include a core-shell type rubber particle, a cross-linked acrylonitrile-butadiene rubber particle, a cross-linked styrene-butadiene rubber particle, and an acrylic rubber particle. The core-shell type rubber particle is a rubber particle having a core layer and a shell layer, and examples thereof may include a two-layer structure in which the shell layer as an external layer is made of a glassy polymer and the core layer as an internal layer is made of a rubbery polymer; and a three-layer structure in which the shell layer as an external layer is made of a glassy polymer, an interlayer is made of a rubbery polymer, and the core layer is made of a glassy polymer. The glassy polymer layer is made of, for example, a polymer of methyl methacrylate, and the rubbery polymer layer is made of, for example, a butyl acrylate polymer (butyl rubber). The rubber particle may be used in combinations of two or more kinds thereof. Specific examples of the core-shell type rubber particle may include Staphyloid AC3832, AC3816N, IM-401 Modified 1, and IM-401 Modified 7-17 (trade name, available from Ganz Chemical Co., Ltd.), and METABLEN KW-4426 (trade name, available from MITSUBISHI RAYON CO., LTD.), Styrene butadiene methacrylate copolymer, PDMS-PS block copolymer, Polyethylene based block copolymers just to cover the whole range of rubber particles that can be used. Specific examples of the cross-linked acrylonitrile butadiene rubber (NBR) particle may include XER-91 (average particle diameter: 0.5 micrometer, available from JSR Corporation). Specific examples of the crosslinked styrene butadiene rubber (SBR) particle may include XSK-500 (average particle diameter: 0.5 micrometer, available from JSR Corporation). Specific examples of the acrylic rubber particle may include METABLEN W300A (average particle diameter: 0.1 micrometer) and W450A (average particle diameter: 0.2 micrometer) (available from MITSUBISHI RAYON CO., LTD.).

An average particle diameter of the rubber particle to be mixed is preferably within a range of 0.005 to 1 micrometer, and more preferably within a range of 0.2 to 0.6 micrometer. The average particle diameter of the rubber particle used in the present invention can be measured by a dynamic light scattering method. For example, the measurement can be carried out by uniformly dispersing the rubber particles in an appropriate organic solvent by ultrasonic wave or the like, preparing the particle size distribution of the rubber particle using a concentrated system particle size analyzer (FPAR-1000, manufactured by Otsuka Electronics Co., Ltd.) on a mass basis, and defining its median diameter as the average particle diameter.

The content of the rubber particle is preferably 0.05 to 10% by weight, and more preferably 0.5 to 5% by weight, relative to 100% by weight of non-volatile components in the resin composition.

Flame Retardant

When the resin composition of the present invention further contains a flame retardant, flame retardancy can be imparted to the composition. Examples of the flame retardant may include an organic phosphorus-based flame retardant, an organic nitrogen-containing phosphorus compound, a nitrogen compound, a silicone-based flame retardant, and metal hydroxide. The organic phosphorus-based flame retardant may be a phenanthrene type phosphorus compound such as HCA, HCA-HQ, and HCA-NQ, available from SANKO CO., LTD., a phosphorus-containing benzoxazine compound such as HFB-2006M available from Showa High Polymer Co., Ltd., a phosphate ester compound such as REOFOS 30, 50, 65, 90, 110, TPP, RPD, BAPP, CPD, TCP, TXP, TBP, TOP, KP140, and TIBP, available from Ajinomoto Fine-Techno Co., Inc., TPPO and PPQ available from HOKKO CHEMICAL INDUSTRY CO., LTD., OP930 available from Clariant Ltd., and PX200 available from DAIHACHI CHEMICAL INDUSTRY CO., LTD., a phosphorus-containing epoxy resin such as FX289, FX305, and TX0712, available from Tohto Kasei Co., Ltd., a phosphorus-containing phenoxy resin such as ERFOOI available from Tohto Kasei Co., Ltd., and a phosphorus-containing epoxy resin such as YL7613 available from Japan Epoxy Resin Co., Ltd. The organic nitrogen-containing phosphorus compound may be a phosphate ester amide compound such as SP670 and SP703, available from Shikoku Chemicals Corporation, and a phosphazene compound such as SPB100 and SPEI00, available from Otsuka Chemical Co., Ltd. and FP-series available from FUSHIMI Pharmaceutical Co., Ltd. Metal hydroxide may be magnesium hydroxide such as UD65, UD650, and UD653, available from Ube Material Industries, Ltd., and aluminium hydroxide such as B-30, B-325, B-315, B-308, B-303, and UFH-20, available from Tomoe Engineering Co., Ltd.

The content of the flame retardant is preferably 0.5 to 10% by weight, and more preferably 1 to 5% by weight, relative to 100% by weight of non-volatile components in the resin composition.

Adhesive Film

The adhesive film of the present invention can be manufactured by a method known to those skilled in the art, for example, by preparing a resin varnish in which the resin composition is dissolved in an organic solvent, applying the resin varnish to a support with a die coater or the like, and further drying the organic solvent by heating, blowing hot air, or the like, thereby forming a resin composition layer.

Examples of the organic solvent may include ketones such as acetone, methyl ethyl ketone and cyclohexanone; acetate esters such as ethyl acetate, butyl acetate, cello solve acetate, propylenegylcol monomethyl ether acetate, and carbitol acetate; carbitols such as cello solve and butyl carbitol; aromatic hydrocarbons such as toluene and xylene; and an amide-based solvent such as dimethylformamide, dimethylacetamide, and N-methylpyrrolidone. The organic solvent may be used in combination of two or more kinds thereof.

Although a drying condition is not particularly limited, it is performed so that the content of the organic solvent in the resin composition layer is 10% by weight or less, and preferably 5% by weight or less. The drying condition varies depending upon the content of the organic solvent in the varnish and the boiling point of the organic solvent. For example, the resin composition layer can be formed by drying the varnish containing 30 to 60% by weight of the organic solvent at 50 to 1500 C. for about 3 to 10 minutes.

In the adhesive film, the thickness of the formed resin composition layer is preferably equal to or more than the thickness of the conductive layer. Since the thickness of the conductive layer in the circuit substrate is generally within a range of 5 to 70 micrometer, the resin composition layer preferably has a thickness of 10 to 100 micrometer.

Examples of the support may include various plastic films including a film of polyolefin such as polyethylene, polypropylene and polyvinyl chloride, a film of polyester such as polyethylene terephthalate (hereinafter may be abbreviated as "PET") and polyethylene naphthalate, a polycarbonate film, and a polyimide film. Further, a release paper, a metal foil such as a copper foil and an aluminum foil, and the like, can be used. The support and a protective film to be described later may be subjected to a surface treatment such as a mat treatment and a corona treatment. Alternatively, the support and the protective film may be subjected to a release treatment with a release agent such as a silicone resin-based release agent, an alkyd resin-based release agent, and a fluororesin-based release agent.

Although the thickness of the support is not particularly limited, it is preferably 10 to 150 micrometer, and more preferably 25 to 50 micrometer.

On the surface of the resin composition layer with which the support is not in contact, a protective film corresponding to the support can be further laminated. The thickness of the protective film is not particularly limited and is, for example, 1 to 40 micrometer. When the protective film is laminated, attachment of dusts or the like or generation of scratch on the surface of the resin composition layer can be prevented. The adhesive film can be wound in a roll form and stored.

Multilayered Printed Wring Board Using Adhesive Film.

Next, an example of a method for manufacturing a multilayered printed wiring board using thus manufactured adhesive film will be described.

Firstly, the adhesive film is laminated on one surface or both surfaces of a circuit substrate using a vacuum laminator. Examples of the substrate used for the circuit substrate may include a glass epoxy substrate, a metal substrate, a polyester substrate, a polyimide substrate, a BT resin substrate, and a thermosetting polyphenylene ether substrate. The circuit substrate used herein refers to a substrate having a patterned conductive layer (circuit) formed on one surface or both surfaces thereof. Further, a multilayered printed wiring board that has alternately layered conductive and insulating layers, and that has a patterned conductive layer (circuit) on one surface or both surfaces of an outermost layer thereof, is also included in the circuit substrate used herein. The surface of the conductive layer may be previously subjected to a roughening treatment such as a blackening treatment and copper etching. In the laminating, when the adhesive film has a protective film, the protective film is first removed, then the adhesive film and the circuit substrate are preheated, if desired, and the adhesive film is compression-bonded to the circuit substrate while pressing and heating. In the adhesive film of the present invention, there is suitably adopted a method in which the adhesive film is laminated on the circuit substrate under reduced pressure by a vacuum lamination method. Although a lamination condition is not particularly limited, it is preferable, for example, that the lamination is carried out under the following condition: A compression bonding temperature (lamination temperature) of preferably 70 to 140° C.; a compression bonding pressure of preferably 1 to 11 kgf/cm$^2$ ($9.8 \times 10^4$ to $107.9 \times 10^4$ N/m$^2$); and under a reduced pressure of 20 mmHg (26.7 hPa) or less in terms of a pneumatic pressure. The lamination method may be a method of batch mode or of continuous mode using rolls. The vacuum lamination can be performed using a commercially available vacuum laminator. Examples of the commercially available vacuum laminator may include a vacuum applicator manufactured by Nichigo-Morton Co., Ltd., a vacuum pressure laminator manufactured by Meiki Co., Ltd., a roll type dry coater manufactured by Hitachi Industries Co., Ltd., and a vacuum laminator manufactured by Hitachi AIC Inc.

The lamination step of performing heating and pressing under reduced pressure can be carried out using a general vacuum hot press machine. For example, the lamination step can be carried out by pressing a metal plate such as a heated SUS plate from a support layer side. As to a pressing condition, a degree of reduced pressure is usually $1 \times 10^{-2}$ MPa or less, and preferably $1 \times 10^{-3}$ MPa or less. Although the heating and pressing can be performed by one stage, it is preferable to perform the heating and pressing separately by two or more stages from the viewpoint of controlling bleeding of the resin. For example, it is preferable to perform the first-stage pressing at a temperature of 70 to 150° C. under a pressure of 1 to 15 kgf/cm$^2$ and the second-stage pressing at a temperature of 150 to 200° C. under a pressure of 1 to 40 kgf/cm$^2$. It is preferable that the pressing is performed at each stage for a period of 30 to 120 minutes. Examples of a commercially available vacuum hot pressing machine may include MNPC-V-750-5-200 (manufactured by Meiki Co., Ltd.) and VHI-1603 (manufactured by KITAGAWA SEIKI CO., LTD.).

The insulating layer can be formed on the circuit substrate by laminating the adhesive film on the circuit substrate, cooling the laminate to about room temperature, releasing the support in the case of releasing the support, and then thermally curing the resin composition layer. A condition for the thermal curing may be appropriately selected depending on the kind and content of each resin component in the resin composition. The condition for the thermal curing is preferably selected from a range at 150° C. to 220° C. for 20 minutes to 180 minutes, and more preferably from a range at 160° C. to 210° C. for 30 to 120 minutes.

After forming the insulating layer, the support is released at this time in the case where the support has not been released before curing. Thereafter, the insulating layer formed on the circuit substrate is perforated as necessary to form a via hole or a through-hole. The perforation can be performed, for example, by a known method using drill, laser, plasma, or the like, or can be performed through a combination of these methods, if necessary. The perforation using a laser such as a carbon dioxide gas laser and a Nd:YAG laser is the most common method.

Subsequently, the conductive layer is formed on the insulating layer by dry plating or wet plating. As the dry plating, there can be used a known method such as vapor deposition, sputtering, and ion plating. In the wet plating, the surface of the insulating layer is subjected to a swelling treatment with a swelling solution, a roughening treatment with an oxidant, and a neutralization treatment with a neutralization solution, in this order, to form convex-concave anchor. The swelling treatment with a swelling solution can be performed by immersing the insulating layer into the swelling solution at 50 to 80° C. for 5 to 20 minutes. Examples of the swelling solution may include an alkali solution and a surfactant solution. An alkali solution is preferable. Examples of the alkali solution may include a sodium hydroxide solution and a potassium hydroxide solution. Examples of a commercially available swelling solution may include Swelling Dip Securiganth P and Swelling Dip Securiganth SBU, available from Atotech. The roughening treatment with an oxidant can be performed by immersing the insulating layer into an oxidant solution at 60° C. to 80° C. for 10 minutes to 30 minutes. Examples of the oxidant may include an alkaline permanganate solution in which potassium permanganate or sodium permanganate is dissolved in an aqueous solution of sodium hydroxide, dichromate, ozone, hydrogen peroxide/sulfuric acid, and nitric acid. The concentration of permanganate in an alkaline permanganate solution is preferably 5 to 10% by weight. Examples of a commercially available oxidant may include an alkaline permanganate solution such as Concentrate Compact CP and Dosing Solution Securiganth P available from Atotech. The neutralization treatment with a neutralization solution can be performed by immersing the insulating layer into the neutralization solution at 30 to 50° C. for 3 to 10 minutes. The neutralization solution is preferably an acidic aqueous solution. Examples of a commercially available neutralization solution may include Reduction Solution Securiganth P available from Atotech.

Subsequently, the conductive layer is formed by combination of electro less plating and electrolytic plating. The conductive layer can also be formed by forming a plating resist with a reverse pattern of the conductive layer and performing only electro less plating. As a subsequent patterning method, there can be used a subtractive method or a semiadditive method which is known to those skilled in the art.

Prepreg

The prepreg of the present invention can be manufactured by impregnating the resin composition of the present invention in a sheet-shaped reinforcing base material made of fiber using a hot melt method or a solvent method and then semi-curing the resultant by heating. That is, the prepreg can be formed so that the resin composition of the present invention is impregnated in a sheet-shaped reinforcing base material made of fiber. As the sheet-shaped reinforcing base material made of fiber, there can be used, for example, those made of fiber that is commonly used for a prepreg, such as a glass cloth and an aramid fiber.

The holt melt method is a method for manufacturing a prepreg by once applying a resin to a coated paper, which has good release properties against the resin, without dissolving the resin in an organic solvent and laminating it onto a sheet-shaped reinforcing base material, or by applying a resin directly to a sheet-shaped reinforcing base material using a die coater without dissolving the resin in an organic solvent. The solvent method is a method in which a resin is dissolved in an organic solvent to prepare a resin varnish similarly to the case of manufacturing the adhesive film, and a sheet-shaped reinforcing base material is immersed in this varnish, thereby impregnating the resin varnish in the sheet-shaped reinforcing base material, and then the resultant is dried.

Multilayered Printed Wring Board Using Prepreg

Next, an example of a method for manufacturing a multilayered printed wiring board using the prepreg thus manufactured will be described. One sheet or optionally a plurality of sheets of the prepreg of the present invention are stacked on the circuit substrate and sandwiched by metal plates via a release film, followed by vacuum press lamination under a pressing and heating condition. The pressing and heating condition is preferably under a pressure of 5 to 40 kgf/cm2 (49×104 to 392×104 N/m2), at a temperature of 120 to 200° C., and for a period of 20 to 100 minutes. It is also possible to laminate the prepreg onto the circuit substrate by a vacuum lamination method and then to perform thermal curing similarly to the case of using the adhesive film. Thereafter, the multilayered printed wiring board can be manufactured by roughening a surface of the cured prepreg and then forming a conductive layer by plating in the same manner as described above.

Semiconductor Device

A semiconductor device can be manufactured using the multilayered printed wiring board of the present invention. A semiconductor device can be manufactured by mounting a semiconductor chip on conducting parts of the multilayered printed wiring board of the present invention. The "conducting part" means a "part for conducting electric signals in the multilayered printed wiring board," which may be positioned on the surface or embedded parts therein. The semiconductor chip is not particularly limited as long as the chip is an electric circuit element made of a semiconductor material.

The method for mounting a semiconductor chip in manufacturing the semiconductor device of the present invention is not particularly limited as long as the semiconductor chip effectively functions. Specific examples thereof may include a wire bonding mounting method, a flip-chip mounting method, a mounting method using a bump less build-up layer (BBUL), a mounting method using an anisotropic conductive film (ACF), and a mounting method using a non-conductive film (NCF).

The "mounting method using a bumpless build-up layer (BBUL)" means "a mounting method in which a semiconductor chip is directly embedded in a concave of a multilayered printed wiring board, followed by connecting the semiconductor chip to the wiring on the printed wiring board." Further, the mounting method is roughly classified into the following BBUL method 1) and BBUL method 2).

BBUL method 1): Method for mounting a semiconductor chip in a concave of a multilayered printed wiring board with an underfilling agent BBUL method 2): Method for mounting a semiconductor chip in a concave of a multilayered printed wiring board with an adhesive film or a prepreg The BBUL method 1) specifically includes the following steps:

Step 1) The conductive layers are removed from both sides of a multilayered printed wiring board, and through-holes are formed with a laser or a mechanical drill in the multilayered printed wiring board.

Step 2) An adhesive tape is stuck to one side of the multilayered printed wiring board, and the base of the semiconductor chip is disposed in the through-hole so that the semiconductor chip is fixed on the adhesive tape. At that time, it is preferable that the semiconductor chip is disposed at a position lower than the height of the through-hole.

Step 3) An underfilling agent is injected and loaded into a space between the through-hole and the semiconductor chip to fix the semiconductor chip in the through-hole.

Step 4) After that, the adhesive tape is peeled off to expose the base of the semiconductor chip.

Step 5) On the base side of the semiconductor chip, the adhesive film or prepreg of the present invention is laminated to cover the semiconductor chip.

Step 6) The adhesive film or prepreg is cured and then perforated by a laser to expose a bonding pad on the base of the semiconductor chip, followed by the roughening treatment, electroless plating and electrolytic plating as described above, to connect the wiring. If necessary, the adhesive film or prepreg may be further laminated.

The BBUL method 2) specifically includes the following steps:

Step 1) Photoresist films are formed on conductive layers on both sides of a multilayered printed wiring board, and apertures are formed only on one side of the photoresist films by a photolithography process.

Step 2) The conductive layer exposed in the apertures is removed using an etching solution to expose an insulating layer, and the resist films on both sides are then removed.

Step 3) All of the exposed insulting layers are removed and perforation is performed with a laser or drill to form concaves. It is preferable to use a laser in which the laser energy can be adjusted so that laser absorption in copper is decreased and laser absorption in the insulating layer is increased, and more preferable to use a carbon dioxide gas laser. The use of such a laser allows removing only the insulating layer without penetrating the conductive layer on the opposite side of the aperture of the conductive layer.

Step 4) The semiconductor chip is disposed at the concave so that the base of the semiconductor chip faces the aperture side, and the adhesive film or prepreg of the present invention is laminated from the aperture side to cover the semiconductor chip and embedded in a space between the semiconductor chip and the concave. It is preferable that the semiconductor chip is disposed at a position lower than the height of the concave.

Step 5) The adhesive film or prepreg is cured and then perforated with a laser to expose a bonding pad on the base of the semiconductor chip.

Step 6) The roughening treatment, non-electrolytic plating, and electrolytic plating as described above, are performed to connect the wiring, and if necessary, an adhesive film or prepreg may further be laminated.

Among the methods for mounting a semiconductor chip, from the viewpoints of downsizing of a semiconductor device and a reduction of transmission loss or from the viewpoints of no influence of thermal history on the semiconductor chip because of using no solder and no strain to be occurred in the future between the resin and the solder, the mounting method using a bump less build-up layer (BBUL) is preferable, the BBUL methods 1) and 2) are more preferable, and the BBUL method 2) is still more preferable.

Other features of the invention will become apparent in the course of the following descriptions of exemplary embodiments which are given for illustration of the invention and are not intended to be limiting thereof.

All percent, ppm or comparable values refer to the weight with respect to the total weight of the respective composition except where otherwise indicated. All cited documents are incorporated herein by reference.

The following examples shall further illustrate the present invention without restricting the scope of the invention.

EXAMPLES

Measurement and Evaluation of Dielectric Permittivity and Loss Tangent

Film samples with a diameter of 40 mm and thickness in the range 20-100 μm were used for the measurements. The thickness of the films was measured with a micrometer gauge (product of Mitutoyo, Japan, 0.001-5 mm). The dielectric measurements were done with a split post dielectric resonator (SPDR) (product of QWED, Poland) at 10 GHz and a vectorial network analyzer E5071C (product of keysight Technologies).

SPDR operated at the TE01δ mode that restricts the electric field component to the azimuthal direction of the film sample (F. Chen et al, Journal of Electromagnetic Analysis and Applications 4 (2012), 358-361). The resonance mode is insensitive to air gaps perpendicular to the film sample.

The dielectric permittivity $D_k$ (also often referred to as dielectric constant) was determined from the resonance frequency shift due to the sample insertion. The typical uncertainty of the permittivity is better than ±1% since the thickness of a sample under test is measured with an accuracy of ±0.7% or better.

The loss tangent $D_f$ can be determined from the Q factors of the empty cavity and the cavity with the sample, respectively, via formula $\tan \delta = 1/Q$. The typical loss tangent resolution was $2 \cdot 10^{-5}$.

The glass transition temperature $T_g$ was determined by DSC.

General Silylation Procedure (GSP)

A mixture of toluene (1000 ml), the hydroxy compound (1 mol of hydroxyl groups) and 1-Methylimidazol (1 mol) were added to round bottom flask. The mixture was stirred until a homogeneous solution was obtained at room temperature. Afterwards the solution was heated to 40° C. and chlortrimethylsilan (1 mol) was added slowly. After completion of the addition the mixture was heated to 100° C. for 6 hours and left at room temperature overnight. The liquid was separated from the precipitated material by means of filtration. Afterwards the residual solvent was removed by vacuum distillation. The obtained product was used as received.

General Polymerization Procedure (GPP)

A mixture of resin and curing agent was put into a disposable metal beaker. The mixture was heated and mixed at the corresponding temperature for 1 minute at 2000 rpm. Afterwards the accelerator was directly added to the mixture at the corresponding temperature and again mixed at 2000 rpm for 1 minute. The material was cast into a stainless steel mold with the dimensions of 36·24·0.5 cm. The filled mould was put into an oven and cured at 180° C. for 90 min. After curing the mould was cooled down to room temperature, opened and the resulting epoxy plate removed. The thin plates were used as received.

General Film Preparation Procedure (GFP)

Epoxy resin DER 332 was mixed with the respective curing agents in methyl ethyl ketone (MEK) with one phr of the accelerator in a stoichiometric ratio of 1:1 and 70 wt % of functionalized silica particles (0.5 μm mean diameter). The solution mixture was then coated on the siliconized side of the PET foil with a blade coater with 185 μm wet film thickness, and cured in the oven at 180° C. for 90 minutes.

Used Materials:

(a) Epoxy Resin
  DER 332:

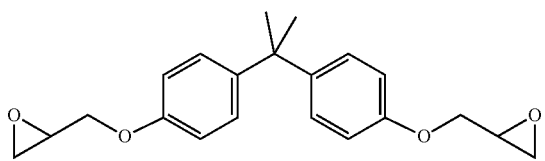 [SMILES: CC(C)(c1ccc(OCC2CO2)cc1)c1ccc(OCC2CO2)cc1]

(b) Curing Agents
  (i) Koresin

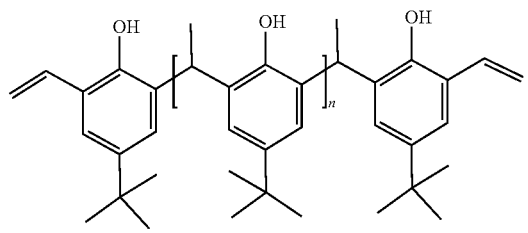

(ii) Koresin-Si: Triethylsilyl derivative of Koresin

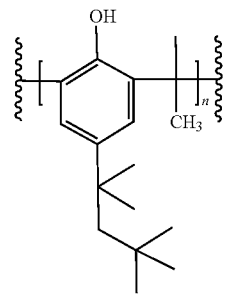

(iii) SP 1068
(iv) SP 1068-Si: Trimethylsilyl derivative of SP 1068
(v) GPH 65

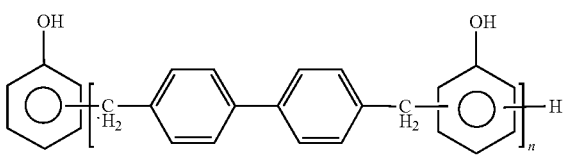

(vi) GPH 65-Si: Trimethylsilyl derivative of GPH 65
(c) Accelerator
  EMIM-DCA available under trade name Basionics™ VS 3 from BASF SE:

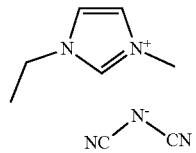

Example 1a

Koresin-Si was prepared from Koresin according to the GSP. A plate was prepared using from Koresin and Koresin-Si, respectively, according to the GPP. The test results are shown in Table 1.

Example 1b

SP 1068-Si was prepared from SP 1068 according to the GSP. A plate was prepared using from SP 1068 and SP 1068-Si, respectively, according to the GPP. The test results are shown in Table 1.

Example 1c

GPH 65-Si was prepared from GPH 65 according to the GSP. A plate was prepared using from GPH 65 and GPH 65-Si, respectively, according to the GPP. The test results are shown in Table 1.

TABLE 1

| Example | Hardener | Tg [° C.] | Dk [10 GHz] | Df [10 GHz] |
|---|---|---|---|---|
| C1a | Koresin | 169.5 | 2.65 | 0.0176 |
| 1a | Koresin-Si | 119.8 | 2.59 | 0.0107 |

TABLE 1-continued

| Example | Hardener | Tg [° C.] | Dk [10 GHz] | Df [10 GHz] |
|---|---|---|---|---|
| C1b | SP1068 | 101 | 2.98 | 0.0075 |
| 1b | SP1068-Si | 101 | 2.88 | 0.0057 |
| C1c | SC 204 | 141 | 3.43 | 0.0132 |
| 1c | SC 204-Si | 121 | 3.41 | 0.0092 |

Table 1 shows that the blocked groups significantly lower the $D_k$ and $D_f$ of the sample.

Example 2

The respective silylated curing agents Koresin-Si, SP 1068-Si, and GPH 65-Si were prepared according to the GSP. Plates were prepared from the silylated curing agents according to the GPP and respective films were prepared according to the GFP above. The test results are shown in Table 2.

TABLE 2

| Curing agent | Type of sample | Tg [° C.] | Dk [10 GHz] | Df [10 GHz] |
|---|---|---|---|---|
| GPH 65-Si | Neat plates | 101 | 2.73 | 0.0081 |
|  | Films | 93 | 3.32 | 0.0078 |
| SP 1068-Si | Neat plates | 93 | 2.57 | 0.0073 |
|  | Films | 101 | 2.88 | 0.0057 |
| Koresin-Si | Neat plates | 119.8 | 2.59 | 0.0107 |
|  | Films | 101.5 | 3.09 | 0.0095 |

When there are no substituent groups on the aromatic backbone of the structure (GPH 65-Si), there is not much difference observed between the $D_f$ of the neat plates and the films with inorganic particles. However, in both cases, when substituent groups were present on the backbone (Koresin-Si and SP 1068-Si), surprisingly the $D_f$ was significantly lowered when inorganic particles were added.

The invention claimed is:

1. A compound of formula C2

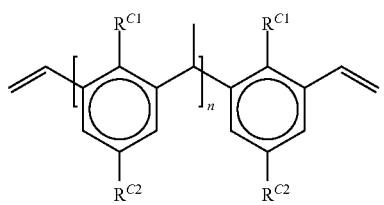 (C2)

wherein
each instance of $R^{C1}$ is independently selected from
a siloxane group of formula C1a

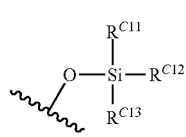 (C1a)

and an ester group of formula C1b

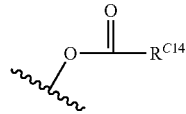 (C1b)

wherein at least one $R^{C1}$ is the siloxane group of formula C1a;
$R^{C2}$ is selected from a bulky $C_4$ to $C_{12}$ alkyl group comprising at least one tertiary or quaternary carbon atom;
$R^{C11}, R^{C12}, R^{C13}$ are independently selected from methyl, ethyl and 1-propyl;
$R^{C14}$ is selected from a linear or branched $C_1$ to $C_8$ alkyl; and
n is an average number of repeating units and is from 1.05 to 200.

2. The compound according to claim 1, wherein $R^{C2}$ is a $C_4$ to $C_8$ branched alkyl group.

3. The compound according to claim 2, wherein $R^{C2}$ is t-butyl; 1,1-dimethyl propyl; 2,2-dimethyl propyl; 2,2-dimethyl butyl; 3,3-dimethyl butyl; or 1,1,3,3-tetramethyl butyl.

4. The compound according to claim 1, wherein n is from 1.5 to 500.

5. The compound according to claim 1, wherein the weight average molecular weight is from 400 to 5 000 g/mol.

6. A resin composition, comprising
(a) an epoxy resin;
(b) a curing agent that is a compound according to claim 1; and
(c) an inorganic filler.

7. The resin composition according to claim 6, wherein the composition further comprises an ester-type curing agent of formula C1,

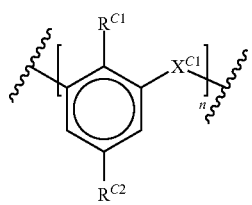 (C1)

wherein $R^{C1}$ is an ester group of formula C1b

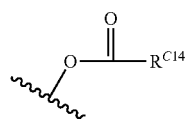 (C1b)

wherein $R^{C14}$ is selected from a linear or branched $C_1$ to $C_8$ alkyl, or a branched $C_3$ to $C_8$ alkyl;
$X^{C1}$ is selected from a divalent $C_1$ to $C_4$ alkanediyl group;
$R^{C2}$ is selected from a bulky $C_4$ to $C_{20}$ alkyl group comprising at least one tertiary or quaternary carbon atom;
and
n is an average number of repeating units and is from 1.05 to 200.

8. The resin composition according to claim 6, wherein the inorganic filler consists of silica.

9. A method comprising providing the resin composition according to claim 8 and depositing an insulating film on a circuit substrate.

10. An insulating layer comprising the resin composition according to claim 8, after curing said resin composition to form an insulating layer, wherein the insulating layer has a dielectric resistance $D_k$ of 3 or below and a loss tangent $D_f$ of 0.02 or below.

* * * * *